April 13, 1926.  1,580,899
J. B. JOHNSON
APPARATUS FOR MODIFYING THE WAVE FORM OF ALTERNATING CURRENT
Filed June 30, 1921
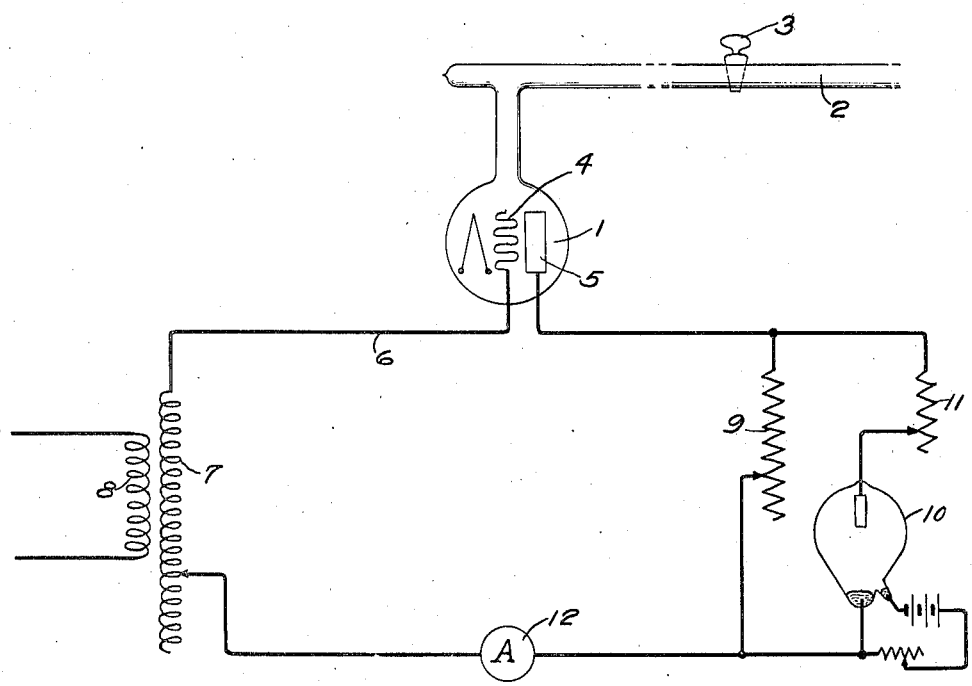
Inventor:
John B. Johnson.
by W. E. Beatty Att'y.

Patented Apr. 13, 1926.

1,580,899

UNITED STATES PATENT OFFICE.

JOHN B. JOHNSON, OF ELMHURST, NEW YORK, ASSIGNOR TO WESTERN ELECTRIC COMPANY, INCORPORATED, OF NEW YORK, N. Y., A CORPORATION OF NEW YORK.

APPARATUS FOR MODIFYING THE WAVE FORM OF ALTERNATING CURRENT.

Application filed June 30, 1921. Serial No. 481,505.

*To all whom it may concern:*

Be it known that I, JOHN B. JOHNSON, a citizen of the United States, residing at Elmhurst, in the county of Queens, State of New York, have invented certain new and useful Improvements in Apparatus for Modifying the Wave Form of Alternating Current, of which the following is a full, clear, concise, and exact description.

This invention relates to a device for modifying the wave form of an alternating current and pertains more particularly to a device of this character capable of use in the evacuation of vacuum tubes of the audion type according to the cathode glow method disclosed in the patent to H. C. Snook, 1,166,792 of January 4, 1916.

According to the method disclosed in the above mentioned patent, an electrode to be denuded of its occluded gas is bombarded by electrons supplied by the ionization of gas provided in the tube for the purpose, thereby heating the electrode and causing a negative glow thereon during the pumping of the tube. This method may be used in the manufacture of vacuum tubes to simultaneously denude the plate and grid electrodes of their occluded gas by causing the alternate bombardment of said electrodes. As the plate electrode, requires more heat than the grid to raise it to the desired temperature, the same amount of energy supplied to each electrode will either burn out the grid or will not sufficiently heat the anode.

It is an object of this invention to provide means for varying the wave form of the current supplied to the electrodes of a tube to be exhausted whereby unequal amounts of energy in the cathode glow according to the heat requirements of said electrodes are delivered to the electrodes. The electrodes are thus both heated to the same temperature.

These objects are accomplished by so connecting the grid and plate electrodes to a source of electrical energy that the electrodes function alternately as the anode and cathode of the circuit and by providing means in the circuit whereby the current flow in one direction is greater than in the other. The connections are such that when the grid electrode is negative the value of the current flowing is less than that of the current flowing when the plate is negative.

This invention will be better understood by having reference to the following specification and accompanying drawing, wherein the figure is a diagrammatic representation of the invention.

The vacuum tube 1 to be exhausted is connected with a vacuum pump (not shown) by means of the glass tubing 2 in which is provided valve 3. The grid electrode 4 and plate 5 of the tube are connected with the terminals of a circuit 6, a portion of which is the variable secondary 7 of a step-up transformer, the primary 8 thereof being connected with a source of electrical energy, not shown. Arranged in this circuit in parallel, are the resistance 9 and the unidirectional current flow device 10, preferably a mercury arc rectifier, having in series therewith the variable resistance 11. The rectifier is so arranged in this circuit that the current cannot flow through it to the plate 5 but may flow from the plate through it. There is also provided in the circuit an ammeter 12.

In the operation of this device the tube 1 is pumped to a vacuum of approximately 1 mm. of mercury, after which an inert gas is introduced into the tube in substantial accordance with the directions in the aforementioned patent to Snook and the valve 3 closed. Ammonia gas is preferably used as inert gas, since the quantity of it used within a tube to obtain the desired pressure will, when decomposed by the passage of a discharge between the electrodes, supply the small amount of hydrogen necessary for deoxidizing any grease or the like on the electrodes or the wall of the tube without danger of the formation of an explosive mixture of hydrogen and oxygen within the tube. The nitrogen from the ammonia supplies electrons for the bombardment. After the introduction of the inert gas alternating current is supplied to the circuit 6 from the transformer and the electrodes are alternately bombarded with electrons supplied by the ionization of the gas in the tube and the exhaustion carried on in substantially the same manner as disclosed in the aforementioned patent.

The resistance 9 is so adjusted that when the direction of the current flow is such that the plate 5 is acting as the anode and the grid 4 as the cathode the energy delivered to the grid in the cathode glow is sufficient to heat it to the desired temperature. The resistance 11 is so adjusted that when the plate 5 is functioning as the cathode and the grid 4 as the anode, the resultant resistance of the circuit is of such a value that enough additional energy is supplied to the plate 5 in the cathode glow to overcome its greater heat requirement and raise it to the desired temperature.

According to this arrangement the wave form of the alternating current in the circuit is so modified that a greater amount of energy in the cathode glow is delivered to the plate than to the grid, thereby varying the bombardment of each electrode without danger of burning out the grid. By adjusting the resistance 11 the form of the half wave flowing toward the plate 5 may be varied without a corresponding variation in the half wave flowing away from the plate.

What is claimed is:

1. In a device of the character described, a vacuum tube having electrodes to be bombarded, said electrodes being of unequal thermal capacity, a source of alternating current connected to said electrodes, and means for rendering the energy delivered to one of said electrodes greater than that delivered to the other.

2. In a device of the character described, a vacuum tube having electrodes to be bombarded, said electrodes being of unequal thermal capacity, a source of alternating current connected in series with said electrodes and a resistance, and a unidirectional current flow device connected in shunt to said resistance whereby the current flow through the circuit is greater in one direction than in the other.

3. In a device of the character described, a vacuum tube having a plate and a grid electrode to be bombarded, said plate being of greater heat requirement than said grid, a source of alternating current connected with said electrodes, and means for supplying a greater amount of electrical energy to the plate than to the grid electrode during bombardment.

4. In a device of the character described, a vacuum tube having a grid electrode and a plate electrode to be bombarded, a source of alternating current connected with said electrodes, and a resistance and a unidirectional current flow device connected in said circuit in parallel, said unidirectional current flow device being so arranged as to prevent the flow therethrough of current away from said plate electrode.

5. In a device of the character described, a vacuum tube having a grid and a plate electrode to be bombarded, a source of alternating current connected to said electrodes, and a resistance and a mercury arc rectifier connected in the circuit in parallel, said rectifier having its anode connected to the plate electrode.

6. The steps in the method of exhausting a vacuum tube having a grid and a plate electrode which comprise causing a negative glow around said electrodes alternately and regulating the energy delivered in the cathode glow to the electrodes according to their thermal capacities.

7. In a device of the character described, a vacuum tube having electrodes of unequal thermal capacities to be bombarded, a source of electrical energy connected to said electrodes, and means for supplying a greater amount of energy to one of said electrodes than to the other.

8. In a device of the character described, a vacuum tube having electrodes of different thermal capacities to be bombarded, means for alternately rendering said electrodes positive and negative, and means for supplying to one of said electrodes a greater amount of energy during bombardment than to the other.

9. In a device of the character described, a vacuum tube having electrodes of different thermal capacities to be bombarded, means for causing the alternate bombardment of said electrodes, and means for supplying unequal amounts of energy to said electrodes during the bombardment.

10. In a device of the character described, a vacuum tube having electrodes of different thermal capacities to be bombarded, means for causing alternate bombardment of said electrodes, and means for controlling the current flow between said electrodes in one direction independently of the current flow in the other direction.

11. In a device of the character described, an electrical instrument having a current path therethrough, means for causing alternating current to traverse said path, and means for varying the form of one half wave of the current traversing said path independently of the other half wave.

12. In a device of the character described, an electrical instrument, means for causing current to flow through said instrument in opposite directions, and means for controlling the current whereby the flow through said instrument in one direction is greater than the flow through said instrument in the other direction.

13. In a device of the character described, an electrical instrument having a current path therethrough, means for causing current to flow through said path in opposite directions, and means for determining the current flow through said path in one direction independent of the current flow through said instrument in the opposite direction.

14. The steps in the method of exhausting vacuum tubes having electrodes of different thermal capacities which comprise causing the alternate bombardment of said electrodes and supplying a greater amount of energy to one of said electrodes than to the other.

15. The steps in the method of removing occluded gas from the electrodes of a vacuum tube which comprise introducing ammonia gas into the tube and causing alternate electron bombardment of said electrodes.

16. The steps in the method of removing gases from a vacuum tube having electrodes which comprise introducing ammonia gas into the tube and decomposing it by the passage of an electric discharge between said electrodes.

In witness whereof, I hereunto subscribe my name this 28th day of June A. D., 1921.

JOHN B. JOHNSON.